(12) United States Patent
Stojanovic et al.

(10) Patent No.: US 12,716,707 B2
(45) Date of Patent: Aug. 25, 2026

(54) METHOD FOR CALIBRATING A SELF-MIXING INTERFEROMETER AND SELF-MIXING INTERFERENCE MEASUREMENT ARRANGEMENT

(71) Applicant: ams International AG, Jona (CH)

(72) Inventors: Goran Stojanovic, Rapperswil (CH); Julian Grosse, Staefa (CH); Nikola Dordevic, Zurich (CH); Laurent Nevou, Wadenswil (CH); Ferran Suarez, Rüschlikon (CH)

(73) Assignee: AMS International AG, Jona (CH)

( * ) Notice: Subject to any disclaimer, the term of this patent is extended or adjusted under 35 U.S.C. 154(b) by 95 days.

(21) Appl. No.: 18/724,590

(22) PCT Filed: Dec. 5, 2022

(86) PCT No.: PCT/EP2022/084400
§ 371 (c)(1),
(2) Date: Jun. 26, 2024

(87) PCT Pub. No.: WO2023/126128
PCT Pub. Date: Jul. 6, 2023

(65) Prior Publication Data
US 2025/0067555 A1 Feb. 27, 2025

(30) Foreign Application Priority Data
Dec. 28, 2021 (DE) ......................... 102021006444.5

(51) Int. Cl.
*G01B 9/02* (2022.01)
*G01B 9/02055* (2022.01)

(52) U.S. Cl.
CPC ..... *G01B 9/02092* (2013.01); *G01B 9/02072* (2013.04)

(58) Field of Classification Search
CPC ............ G01B 9/02072; G01B 9/02092; G01B 9/02062; G01B 9/02067
See application file for complete search history.

(56) References Cited

U.S. PATENT DOCUMENTS 4,101,847 A * 7/1978 Albanese ............ H01S 5/06835 372/37
7,485,847 B2 2/2009 Degertekin et al.
(Continued)

FOREIGN PATENT DOCUMENTS

WO 2021158176 A1 8/2021

OTHER PUBLICATIONS

Guido Giuliani et al., "Self-mixing laser diode vibrometer", Institute of Physics Publishing; Measurement Science and Technology, vol. 14, p. 24-32, Nov. 21, 2002, Total p. 09 (Year: 2002).*
(Continued)

*Primary Examiner* — Michelle M Iacoletti
*Assistant Examiner* — Alexandria Mendoza
(74) *Attorney, Agent, or Firm* — Slater Matsil, LLP

(57) ABSTRACT

In an embodiment a includes providing the self-mixing interferometer including a laser diode, emitting laser light and receiving a reflected portion of the emitted laser light to modulate an optical power of the laser diode, the interferometer having a transfer function of the optical power of the laser diode having fringes, locking a phase of the laser light to at least one of the fringes to obtain an operating point, generating an interrogation signal to change a wavelength of the laser light to obtain a response signal indicative of an offset of the operating point from a desired operating point and generating a compensation signal depending on the response signal.

15 Claims, 11 Drawing Sheets

(56) References Cited

U.S. PATENT DOCUMENTS

| | | | | |
|---|---|---|---|---|
| 2018/0234761 | A1* | 8/2018 | Fishman | H04R 3/005 |
| 2019/0313178 | A1 | 10/2019 | Mutlu et al. | |
| 2020/0200522 | A1 | 6/2020 | Huang et al. | |
| 2020/0370879 | A1 | 11/2020 | Mutlu et al. | |
| 2021/0010797 | A1 | 1/2021 | Cihan et al. | |
| 2021/0011559 | A1 | 1/2021 | Mutlu et al. | |
| 2021/0080248 | A1 | 3/2021 | Cihan et al. | |
| 2023/0047060 | A1 | 2/2023 | Seurin et al. | |

OTHER PUBLICATIONS

Michele Norgia et al., "Absolute Distance Measurement With Improved Accuracy Using Laser Diode Self-Mixing Interferometry in a Closed Loop", IEEE Transactions on Instrumentation and Measurement, vol. 56, No. 5, p. 1894-1900, Oct. 2007, Total p. 07 (Year: 2007).*

Alessandro Magnani et al., "Self-mixing digital closed-loop vibrometer for high accuracy vibration measurements", Optics Communications, vol. 365, p. 133-139, Dec. 14, 2015, Total p. 07.

Guido Giuliani et al., "Self-mixing laser diode vibrometer", Institute of Physics Publishing; Measurement Science and Technology, vol. 14, p. 24-32, Nov. 21, 2002, Total p. 09.

Glen W. Johnson et al., "Design and construction of a phase-locked interference microscope", SPIE vol. 103 Systems Integration & Optical Design II, p. 76-85, Aug. 10, 1977, Total p. 10.

Alessandro Magnani et al., "Self-mixing Interferometer for Contactless Vibration Measurements", Recent Researches in Electrical and Computer Engineering, p. 182-189, Jan. 1, 2015, Total p. 08.

Michele Norgia et al., "Absolute Distance Measurement With Improved Accuracy Using Laser Diode Self-Mixing Interferometry in a Closed Loop", IEEE Transactions on Instrumentation and Measurement, vol. 56, No. 5, p. 1894-1900, Oct. 2007, Total p. 07.

Michele Norgia et al., "Frequency Compensation for a Self-Mixing Interferometer", IEEE Transactions on Instrumentation and Measurement, vol. 59, No. 5, p. 1368-1374, May 2010, Total p. 07.

Takamasa Suzuki et al., "Phase locked laser diode interferometry for surface profile measurement", Applied Optics, vol. 28, No. 20, p. 4407-4410, Oct. 15, 1989, Total p. 04.

Takamasa Suzuki et al., "Self-mixing type of phase-locked laser diode interferometer", Society of Photo-Optical Instumentation Engineers, Oct. 5, 1998, Total p. 06.

* cited by examiner

Io_cmd
Io amplitude setup and pulsating generator
101
Im1
Im2
Oscillator
105
Io(t)
Signal Processing
102
Io_cmd
107
Dout
109
Io_cmd
Ic(t)
Is(t)
VCSEL current driver
103
VCSEL+PD (power output)
104
Ivcsel(t)
106
ds(t)

102
Is(t)
201
210
DC cut
220
Unwrapper (optional)
S(t)
230
Digital Integrator
S/H
231
SH(t)
LPF or BPF
232
240
Current Comparator and DAC
Ic(t)
202
Pulse Generator (sampling)
214
Io(t)
Io_cmd P
Po_Im2
Po_Im1
310
306
304
307
2π
2π
$\phi = 2ks = 2 * \left(\frac{2\pi}{\lambda}\right) * s$
so
s
=λ/4
=λ/4
Io
I
301
t
Is(t)
305
Is@Po_Im2
Is@Po_Im1
t
Io
Im2
Im1
302
303
t P
Po_Im2
Po_Im1
407
404
2π
2π
$\phi = 2ks = 2*\left(\frac{2\pi}{\lambda}\right)*s$
s0
s
=λ/4
=λ/4
Io
I
t
Is(t)
Is@Po_Im2
Is@Po_Im1
405
t
Io
Im2
Im1
403
t P
Po_Im2
Po_Im1
506
504
520
2π
2π
ϕ=2ks=2*(2π/λ)*s
s0
≈λ/4
≈λ/4
s
Io
I
t
Is(t)
Is@Po_Im2
505a
505
Is@Po_Im1
505b
t
521
Io
Im2
Im1
503
t P
Po
2π
620
601
λ/4
λ/4
t
$\phi = 2ks = 2*\left(\frac{2\pi}{\lambda}\right)*s$
s
SH (t)
t
630
S (t)
t
Ivcsel (t)
Io
Im2
t P
Po
≈λ/4
≈λ/4
2π
707
709
701
φ = 2ks = 2*(2π/λ)*s
s
t
SH (t)
S (t)
744
741
743
742
Ivcsel (t)
Io Io_cmd
Im1
Im2
811
Isi
Isi
801
tpwr_up
802
t_io
t_signal
821
821a
821b
Isi_detect
812 ds(t)
VCSEL + PD
(power output)
903
Ivcsel(t)
VCSEL current driver
Is(t)
Ic(t)
Signal Processing
902
Im1(t)
Im2(t)
Im1(t)
Im2(t)
Im1 Im2
901
Im1 and Im2
pulsating generator
Oscillator Is(t)
Im1(t)
Im2(t)
902
1010
1011
Pulse Generator (sampling)
1014
Pulse Generator (sampling)
1015
DC cut
DC cut
Unwrapper (optional)
Unwrapper (optional)
S_im1(t)
S_im2(t)
Comparator and digital Integrator
1030
S/H
SH1(t)
S/H
SH2(t)
Samples comparator
1034
LPF or BPF
1032
Current Comparator and DAC
1040
Ic(t)

METHOD FOR CALIBRATING A SELF-MIXING INTERFEROMETER AND SELF-MIXING INTERFERENCE MEASUREMENT ARRANGEMENT

CROSS-REFERENCE TO RELATED APPLICATIONS

This patent application is a national phase filing under section 371 of PCT/EP2022/084400, filed Dec. 5, 2022, which claims the priority of German patent application 102021006444.5, filed Dec. 28, 2021, each of which is incorporated herein by reference in its entirety.

TECHNICAL FIELD

The present disclosure relates to a method to calibrate a self-mixing interferometer. Specifically, the present disclosure relates to a method to calibrate a self-mixing interferometer that includes a laser diode to emit laser light, wherein a reflected portion of the laser light modulates the optical power of the laser diode. Furthermore, the present disclosure relates to a self-mixing interference measurement arrangement to measure the vibration of a movable target using laser light and reflected laser light that modulates the power of the laser diode.

BACKGROUND

Self-mixing interferometers are often used to measure displacements of a target or an absolute distance of a target. The self-mixing interferometric measurement technique can be employed in microphones or loudspeakers to measure the vibration of the membrane and/or the absolute distance between the laser diode and the membrane and convert the acoustic energy received at the membrane to an electric signal through self-mixing interferometry. The electrical signal may be further processed in a device using audio signal processing such as a mobile communication device such as a smartphone.

A self-mixing interferometer emits laser light from a laser diode which is reflected at the membrane and received back in the cavity of the laser arrangement so that the power of the light in the cavity is modulated. The modulated light power can be monitored by a photodiode associated with the laser arrangement as, e.g., a photo current generated by the photodiode. The photo current may be used to control operation of the interferometer and as an output signal representative of the acoustic signal received by the microphone or loudspeaker. The transfer function representing the modulated power in dependence on the interferometric phase of the laser arrangement is represented by a sequence of fringes, wherein one fringe represents a $\lambda/2$ phase change with $\lambda$ being the wavelength of the light emitted by the laser diode.

An optimum operating point of the interferometer is at the middle position of one of the fringes or at a half fringe position, where the transfer function is relatively linear allowing a large amplitude and a larger dynamic range. However, the interferometer may exhibit an offset that could be generated during the lifetime or during operation of the interferometer by low frequency events such as aging of the laser diode, change of temperature or change of humidity during operation etc. As such an offset is inherently present in the interferometer, there is a need to calibrate the interferometer and compensate the offset to a useful amount or remove the offset almost completely.

SUMMARY

Embodiments provide a method to automatically calibrate a self-mixing interferometer.

Further embodiments provide a self-mixing interferometer arrangement to perform the automatic calibration method.

According to an embodiment, a method for calibrating a self-mixing interferometer comprises the providing of a self-mixing interferometer including a laser diode and the emitting of laser light and receiving of a reflected portion of the emitted laser light to modulate the optical power of the laser diode. The interferometer has a transfer function of the optical power of the laser diode, wherein the transfer function comprises fringes. The phase of the laser light is locked to at least one of the fringes to obtain an operating point. An interrogation signal is generated to change the wavelength of the laser light to obtain a response signal indicative of an offset of the operating point from a desired operating point. A compensation signal is generated to obtain a calibrated operating point in response to or depending on the response signal.

The calibration method includes a control loop so that it can be performed autonomously and in automated fashion. The calibration process does not require manual interaction as may be the case with conventional self-mixing interferometers so that it can be included in a miniaturized environment useful for integration in compact electronic devices such as handheld communication devices or mobile phones or smartphones.

Furthermore, the process includes a control loop which moves the corrected operating point closer to an optimum operation point of the interferometer, e.g., at a half fringe position of the transfer function. The calibration process is energy efficient and does not require much operating power compared to complex calculations such as a frequency analysis by a FFT (Fast Fourier Transform) as may be performed in conventional interferometers. Repetitive operation of the calibration process can be performed after expiry of a predetermined amount of displacement measurements to further improve the calibration or compensate additional low frequency variations of the offset. In fact, automatic calibration can be performed at every measurement pulse, as the signal to be measured signal is a low-frequency signal compared to the effect of the interrogation signal of the calibration process.

The automated calibration process allows a pulsed laser operation for a pulsed displacement measurement as the calibration continuously calibrates the interferometer and compensates any offset. The laser diode may be operated with a low duty cycle to additionally save operating power which makes the interferometer useful for battery operated handheld electronic devices such as smartphones. In practice, the laser diode may be operated with a duty cycle in the range of between 5% to 50% which saves a considerable amount of operating power while the interferometer is still useful to measure acoustic signals received at a membrane in a microphone or a loudspeaker. In an embodiment, the duty cycle may be 10% or close to 10%.

According to an embodiment of the calibration method, the calibrated operating point is disposed at half of the at least one of the fringes of the transfer function or close to half of the at least one of the fringes of the transfer function. The transfer function of the interferometer is relatively linear around the half fringe position so that a large load signal is acceptable without occurring an overload situation.

According to an embodiment, the interrogation signal is pulse-shaped and determined such that the laser light is changed by a quarter of the wavelength of the laser light or close to a quarter of the wavelength of the laser light. This allows the detection of a cliff at the edge of a fringe so that an as large as possible disturbance of the self-mixing interference (SMI) operation of the laser diode is caused which allows to generate an accurate compensation signal to correct the offset.

According to an embodiment, the interferometer includes a monitoring photodiode disposed close to the cavity the laser diode. The photodiode generates a response signal which is representative of the optical power of the laser diode. The generated photo current may be only positive or only negative. This indicates that the interferometer has no offset as the operating point is at half fringe so that the interrogation signal generates a purely negative or purely positive response current only. The generated photo current may include positive and negative portions. This indicates that an offset is present so that the operating point is not at a half fringe position so that the interrogation signal generates a response current along two neighboring fringes of the transfer function resulting in said positive and negative photo current portions.

According to an embodiment, the photo current from the monitoring photodiode may be compared with a comparison threshold range in response to the generating of the interrogation signal. A photo current exceeding the threshold range indicates an offset so that a compensation signal is generated to compensate the offset. A photo current only within the threshold range indicates that no offset to be compensated is determined. The threshold range may be defined by two threshold levels. When the threshold range is exceeded, the response current crosses both levels. When the response signal is within the threshold range, only one level is crossed.

According to an embodiment, the interrogation signal includes a first reference current to lock the phase of the laser light to the at least one of the fringes so that an operating point is obtained. The interrogation signal includes a second reference current to change the wavelength of the laser light by a quarter of the wavelength or close to a quarter of the wavelength to detect a cliff or a transition point between two fringes in the transfer function.

According to an embodiment, the self-mixing interferometer is operated in a normal operation mode used for a displacement measurement, during which the laser diode emits light that is reflected at a moving target such as a membrane of a microphone or loudspeaker. The optical power of the laser diode is modified by the reflected portion of the laser light. In normal operation, the laser diode is driven in response to a difference between the interrogation signal and the compensation signal so that the operating point is moved closer to the desired optimum operating point by the calibration step. In this case, the second reference current included in the interrogation signal is reduced also in response to the compensation signal.

According to an embodiment, the laser diode is operated with a duty cycle to perform a measurement of the vibration of the movable target so that laser light is emitted in a series of consecutive pulses and the interrogation signal is generated repetitively after a predetermined number of the consecutive pulses to perform a calibration operation and update the compensation of the offset and account for low frequency variations of the offset. The interrogation signal may be generated after each one of the consecutive measurement pulses of the laser diode.

According to an embodiment, a self-mixing interference (SMI) measurement arrangement comprises a laser diode which is configured to emit laser light and configured to receive a portion of reflected laser light of a moving target. The arrangement further comprises a photodiode which is configured to generate a photo current indicative of the optical power emitted by the laser diode. A current driver is configured to generate a current to operate the laser diode. An amplitude setup circuit is configured to generate a current representative of the interrogation signal. A signal processor is configured to receive the photo current and to receive the interrogation signal and generate an output signal indicative of an offset of the operating point from the desired operating point. The output signal is used to compensate the offset.

According to an embodiment, the signal processor comprises an input terminal configured to operatively receive the photo current; a DC component cutter connected to the input terminal and configured to remove a DC component; a sample and hold circuit configured to provide a sample of an output signal of the DC component cutter; and a current comparator configured to determine a difference between the photocurrent and the interrogation signal.

According to an embodiment, the signal processor further comprises a low-pass filter or a band-pass filter which is disposed between the DC component cutter and the current comparator. The low-pass or band-pass filter can be selectively enabled in a normal operation mode so that the current driver receives the interrogation signal and generates a current to operate the laser diode by a difference between the interrogation signal and the output signal indicative of an offset of the operating point from the desired operating point.

According to an embodiment, an electro-acoustic device comprises a membrane or diaphragm configured to receive or emit acoustic energy and the self-mixing interference measurement arrangement described above. The membrane is configured to reflect laser light emitted by the laser diode. A terminal is connected to the self-mixing interference measurement arrangement to provide a signal indicative of the acoustic energy received or emitted by the membrane. The electro-acoustic device may be a microphone or a loudspeaker that is configured to be incorporated in a mobile communication device or a smartphone or another audio signal processing device such as a smart speaker. The signal generated at the terminal may be used in the mobile communication device or the smartphone or the smart speaker to process the acoustic signal.

BRIEF DESCRIPTION OF THE DRAWINGS

It is to be understood that both the foregoing general description and the following detailed description are merely exemplary, and are intended to provide an overview or framework to understand the nature and character of the claims. The accompanying drawings are included to provide a further understanding and are incorporated in, and constitute a part of, this description. The drawings illustrate one or more embodiments, and together with the description serve to explain principles and operation of the various embodiments. The same elements in different figures of the drawings are denoted by the same reference signs.

DETAILED DESCRIPTION OF ILLUSTRATIVE EMBODIMENTS

The present disclosure will now be described more fully hereinafter with reference to the accompanying drawings showing embodiments of the disclosure. The disclosure may, however, be embodied in many different forms and should not be construed as limited to the embodiments set forth herein. Rather, these embodiments are provided so that the disclosure will fully convey the scope of the disclosure to those skilled in the art. The drawings are not necessarily drawn to scale but are configured to clearly illustrate the disclosure.

Self-Mixing Interference Measurement Arrangement

Figure 1:
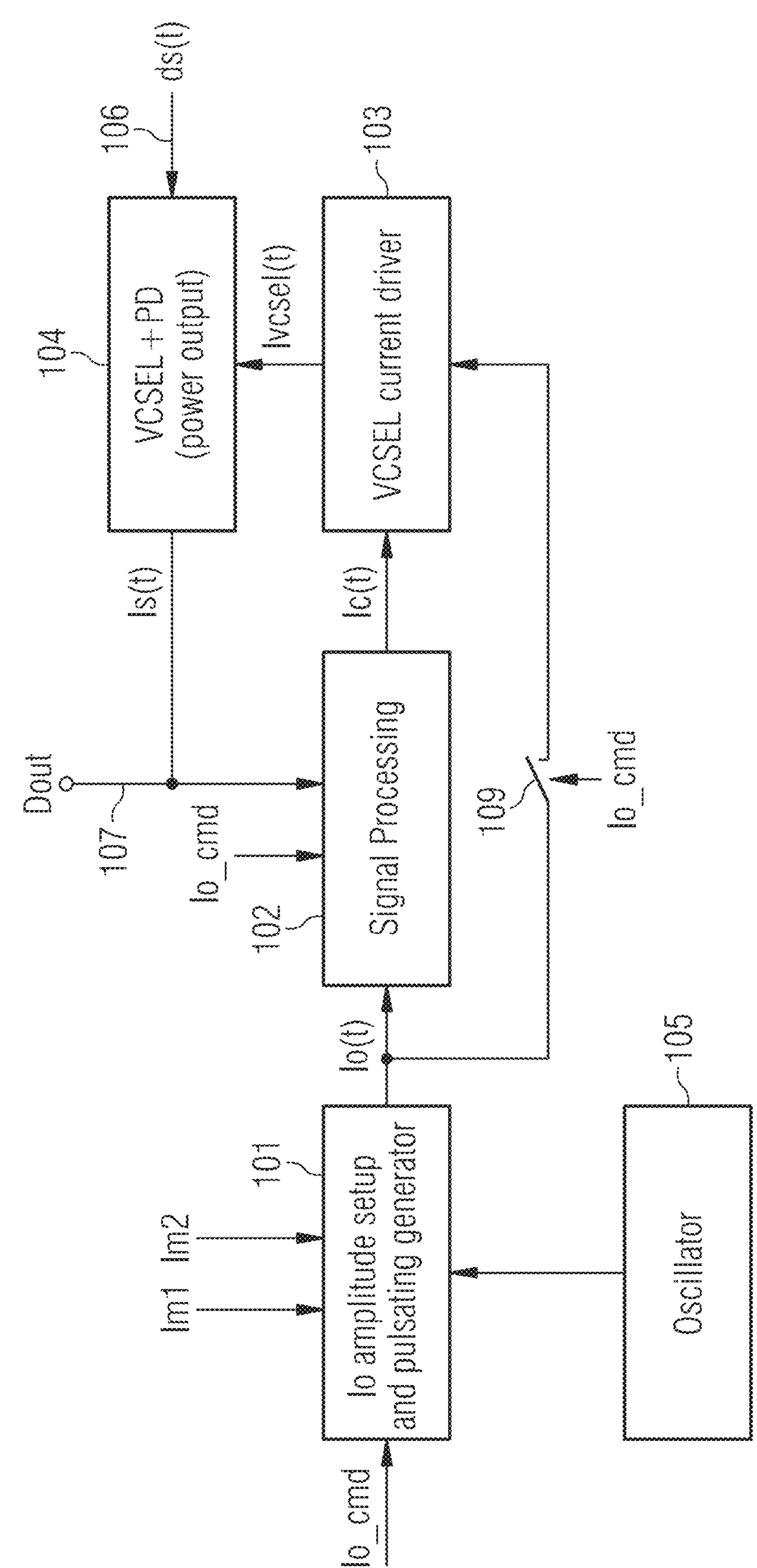
FIG. 1 shows a block diagram of a self-mixing interference measurement arrangement.

FIG. 1 shows a block diagram of a self-mixing interference measurement arrangement. The block diagram includes a laser diode and photodiode circuit 104. A VCSEL current driver circuit 103 generates the current Ivcsel(t) to operate the VCSEL. A circuit 101 has the function of amplitude generation and pulsating generation to generate an interrogation signal Io(t). An oscillator 105 provides the time bases for the pulses generated in circuit 101. Circuit 101 receives reference currents Im1, Im2 and control signal Io_cmd which switches between calibration mode and normal operation mode. A signal processor circuit 102 receives the photo current Is(t) from circuit 104 and the interrogation signal Io(t) from circuit 101 and generates a compensation signal Ic(t) to be forwarded to circuit 103.

During normal operation, the compensation current from a previous calibration operation is applied to the VCSEL current driver 103 and also the interrogation current from circuit 101 is forwarded to circuit 103 through switch 109. During calibration, switch 109 is open or non-conductive, during normal operation, switch 109 is closed or conductive. A terminal 107 is connected to circuit 104 to provide the photodiode current Is(t) as output signal Dout to further processing circuits (not shown). Signal Dout may be converted to a digital signal through an analog-to-digital converter (not shown).

In more detail, the laser diode of circuit 104 represents an optical laser transducer including laser diode, membrane and monitoring photo diode. The laser diode may be a VCSEL (vertical cavity surface emitting laser) which emits laser light into a space that is confined by a membrane of a microphone or a loudspeaker. The membrane may be static when it does not receive acoustic energy through an acoustic signal or may vibrate when it receives an acoustic signal. The acoustic signal changes the distance between the laser diode and the membrane so that a portion of the laser light impinging on the membrane is reflected back to the laser diode and is mixed in the cavity of the laser diode to generate an interference effect, so-called self-mixing interference (SMI) displacement measurement. The light power in the VCSEL is monitored by a photodiode which is disposed in the vicinity of the VCSEL. A skilled person is aware of several possibilities to arrange the photodiode relative to the VSCEL to monitor the self-mixing photonic power of the VCSEL. The photo current Is(t) represents the SMI signal and monitors the photonic power directly from the VSCEL when a two side emission VCSEL is used or the photonic power reflected from the membrane when a single side emission VCSEL is used.

Signals of the Self-Mixing Interference Measurement Arrangement

The signals operating the circuit of FIG. 1 are as follows. The VCSEL current driver 103 generates the current Ivcsel(t) in response to a compensation current Ic(t) and the operating mode. During calibration mode, the VCSEL current driver 103 generates two currents that are replica of the interrogation current Io(t) with the reference current amplitudes Im1 and Im2. During normal operation mode, the VCSEL current driver 103 generates the VCSEL drive current Ivcsel(t) with an amplitude depending on the interrogation signal Io(t) and the compensation current Ic(t) representing the offset detected during calibration mode. The Io amplitude setup and pulsating generator circuit 101 generates the interrogation current Io(t). An amplitude of interrogation current Io(t) is determined during the calibration mode and can have the value of Im1 or Im2. The pulsating frequency of the components of interrogation current Io(t) is determined by the oscillator frequency of oscillator 105. The duty cycle of interrogation current Io(t) is determined by a logic block included in circuit 101.

The displacement signal ds(t) represents the mechanical function and displacement of the membrane, e.g., of a microphone or a loudspeaker. Usually the displacement for sound pressure level such as the nominal sound pressure level is in the range of nanometers, e.g., 5 to 30 nm. In an embodiment, the nominal sound pressure level may be 10 nm. The displacement is a linear function of the sound pressure applied. In the SMI transfer functions shown in FIGS. 3 to 7 and 11, the signal ds(t) is represented on the horizontal or x-axis as variable s.

The photodiode signal current Is(t) contains a static DC component that is present even when the membrane does not move when no audio signal is applied. The AC component of signal Is(t) is proportional to the SMI transfer function shown as SMI power versus SMI phase $\Phi$ in FIGS. 3 to 7 and 11. The optical or photonic power of the VCSEL is applied on the photodiode so that the photodiode current Is(t) is generated with DC and AC components. The AC component is evaluated to determine the offset and the compensation current. The level of Is(t) depends on the SMI transfer function of the VCSEL such as the slope of the photonic power versus phase Φ and the photo responsibility of the photodiode (e.g. 0.2 A/W to 0.3 A/W).

The drive current Ivcsel(t) drives the laser diode and is part of the optical phase locking loop. The VCSEL current driver 103 generates the Ivcsel(t) current in normal operation mode by a combination of the interrogation current Io(t) and the compensation current Ic(t) and in calibration mode only dependent on the compensation current Ic(t).

The control signal Io_cmd is a digital control signal having two states such as ON/OFF or 0/1. A logic high (1) indicates that calibration mode is activated, a logic zero (0) indicates that normal operation mode is activated. Also the complementary control states are possible.

The reference currents Im1, Im2 are DC currents that are forwarded to the interrogation signal Io(t) in pulsed fashion. The amplitudes of Im1, Im2 are determined such that a change of λ/4 is caused in the SMI power phase @, when the membrane displacement is static, ds(t)=0, wherein λ is the wavelength of the monochromatic light generated by the VCSEL. By applying oscillator pulses from oscillator 105, pulsed currents are generated having amplitudes Im1, Im2, respectively, to be included in interrogation signal Io(t).

The interrogation current Io(t) includes pulsed currents with corresponding amplitudes derived from reference currents Im1, Im2 further depending on the operating mode. During calibration mode, interrogation current Io(t) includes two amplitude values of reference currents Im1, Im2. During normal operation mode, interrogation current Io(t) includes only one amplitude, either Im1 or Im2 depending on the fringe in the SMI transfer function on which the interferometer was locked during calibration mode.

The compensation current Ic(t) is the output current of the signal processor 102 pulsed with the same frequency and duty cycle as the interrogation current Io(t). In normal operation, the amplitude of compensation current Ic(t) depends on the offset detected during calibration mode. If no offset is detected, current Ic(t) is zero (Ic(t)=0). If an offset is detected, the current Ic(t) is different from zero and the control loop will regulate the value of the current Ic(t) in subsequent operation cycles until the detected offset is compensated and zero or relatively close to zero. In normal operation mode, the current Ic(t) will be added or subtracted from the interrogation current Io(t), wherein the interrogation current Io(t) is forwarded to the VCSEL current driver 103 in that switch 109 is closed, in order to keep locking at half-fringe.

The drive current Ivcsel(t) is the output signal of the VCSEL current driver 103 to drive operation of the VCSEL laser diode. In calibration mode, the current Ivcsel(t) is switched between the reference current amplitudes Im1, Im2. During normal operation, the drive current Ivcsel(t) is directly impacted by the detected offset and the corresponding compensation current Ic(t).

Signal Processor

Figure 2:
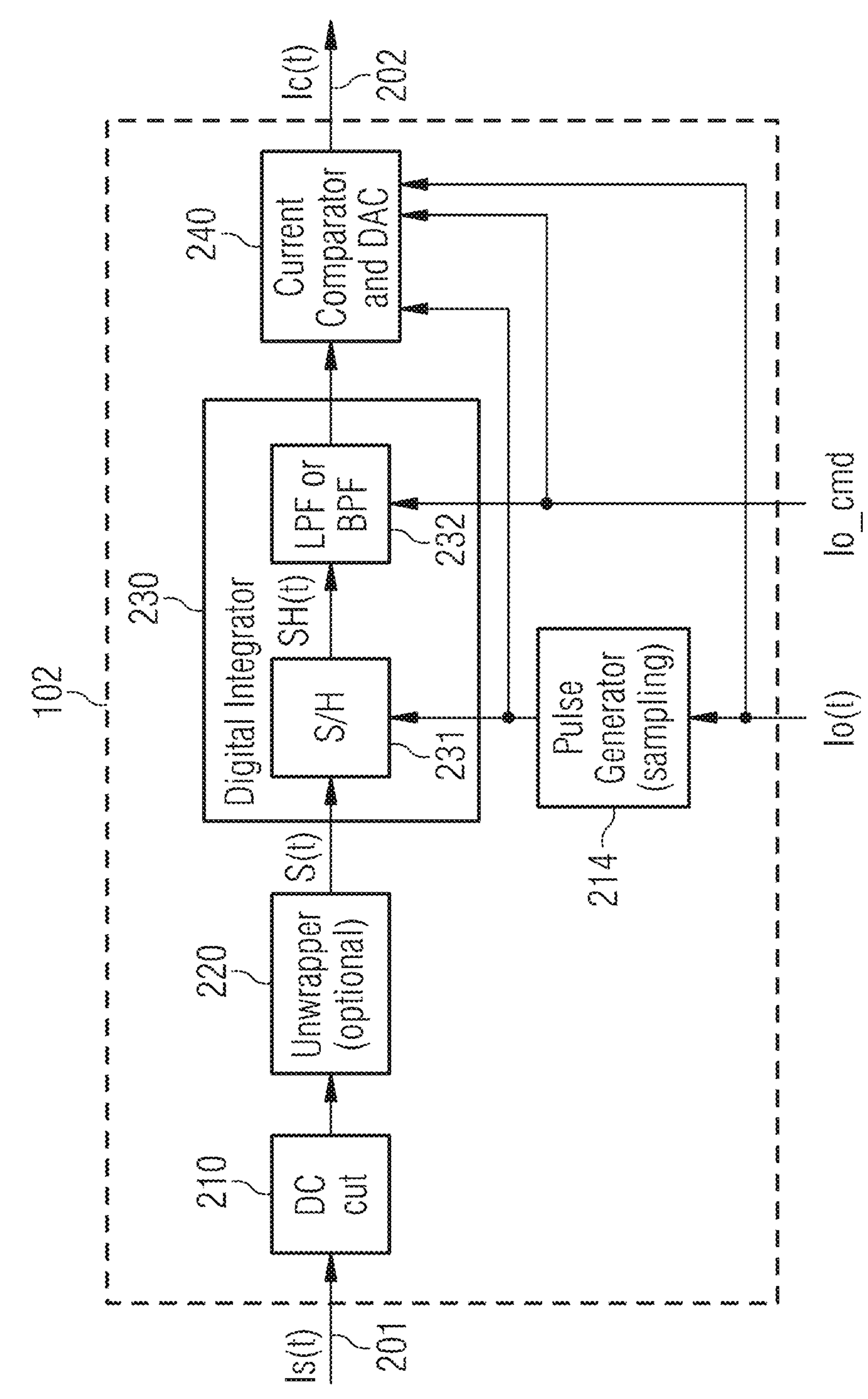
FIG. 2 shows a block diagram of the signal processing circuit of FIG. 1.

FIG. 2 shows the signal processing circuit 102 of FIG. 1 in more detail. Circuit 102 includes a DC cutter 210 connected to input terminal 201 supplying photo current Is(t). Circuit 210 removes a constant, static current component from the photo current Is(t) so that only the AC component S (t) is forwarded to a digital integrator 230. The DC component can be subtracted from the photo current Is(t) by applying a predefined P/I characteristic of the VCSEL. In general, the DC cutter represents a current subtracting block. An un-wrapper circuit 220 may be disposed between DC cutter 210 and integrator 230 as explained later in connection with FIG. 7 to handle an overload situation. Basically, the un-wrapper circuit 220 is optional. The digital integrator 230 extracts the DC signal or the AC signal depending on operation mode and determines if some offset is present. The integrator 230 includes a sample and hold circuit 231 to generate a pulse SH(t) of AC signal S(t) at a time instant determined by interrogation signal Io(t) through sampling pulse generator 214. The sample pulse period is extracted from interrogation signal Io(t). The sample and hold circuit 231 generates a digitized replica of the AC signal S (t). A filter block 232 disposed downstream the sample and hold circuit 231 is an adaptive digital filter controlled by signal Io_cmd so that it is selectively disabled in calibration mode and enabled in normal operation mode. During calibration mode, filter circuit 232 passes the signal SH(t). A current comparator and digital-to-analog converter circuit 240 receives the sampled signal SH(t). During calibration mode, circuit 240 generates a compensation current Ic(t) in dependence on the offset detected. Circuit 240 detects if an offset is present by monitoring if only positive or only negative pulses or pulses having positive and negative portions are generated in the photo current Is(t) by the interrogation signal Io(t). Circuit 240 may compare the AC components in signal Is(t) with a positive and a negative comparison level Isi or a comparison margin Isi_detect as explained later in connection with FIG. 8. Based on the detected offset, circuit 240 generates a compensation current Ic(t) at output terminal 202 of signal processing circuit 102. The current comparator forms a difference between signal SH(t) and the interrogation signal Io(t) by current comparison and generates a comparison current signal Ic(t) by a DA conversion of the difference. Filter 232 can be selectively enabled by control signal Io_cmd in normal operation. In normal operation mode, the low pass filter (LPF) function is used for phase locking only. The band pass filter (BPF) function is used for phase locking and phase nulling.

The operation of the circuits shown in FIGS. 1 and 2 is as follows. During calibration mode, when an offset and a corresponding compensation current are determined, the circuit detects the value of the offset that may be generated due to some low frequency event such as ageing of the VCSEL, impact of temperature, humidity and others. The circuit performs half fringe locking using one current value, e.g., Im1 (or Im2). Then, the circuit applies a short term disturbance pulse to the VCSEL in that it applies a current pulse with the other current value, e.g., Im2 (or Im1). It checks the value of the response to the application of the disturbance current pulse by checking the photodiode current Is(t) in response to the other current value, e.g., Im2 (or Im1). If an offset is detected by monitoring the current Is(t) in the signal processing block 102, the block current comparator and DAC 240 will add or subtract the AC component of current Is(t) from the interrogation current Io(t) in order to compensate for the offset and keep the current Ivcsel(t) to the value that will ensure fringe locking. Therefore, after the calibration step, the interrogation current will contain the reference currents Im1 or Im2, wherein the offset related current is added or subtracted therefrom depending of the offset value detected.

In normal operation mode, when a compensation signal is applied and the circuit is prepared to receive an acoustic input signal ds(t), the circuit of the block diagram is locked for the interrogation current Io(t) plus an additional current that is calculated during calibration mode. The additional current can be added or subtracted to the interrogation current Io(t), e.g., in the VCSEL current driver circuit 103 depending on the monitoring photodiode current Is(t) that is detected during the calibration mode. The closed control loop in normal operation mode includes the VCSEL and photodiode circuit 104, the signal processing circuit 102 and the VCSEL current driver 103. During normal operation mode, a DC component in the photodiode current Is(t) is detected in the signal processing circuit 102 and is present after the low pass filter block 232 when only half fringe locking operates. When half fringe locking and phase nulling is operative, the band pass filter 232 is used instead of the low pass filter function. The additional offset current detected is compensated in the current comparator and DAC circuit 240 in order to keep locked to the current that is determined during calibration mode. Alternatively, the additional offset current can be compared with the interrogation current Io(t) inside the VCSEL current driver 103 and change the drive current Ivcsel(t) accordingly and to keep half fringe locking.

The operation of the circuits of FIGS. 1 and 2 are now described in connection with the waveform diagrams of FIGS. 3 to 8.

Waveforms and Operation

Figure 3:
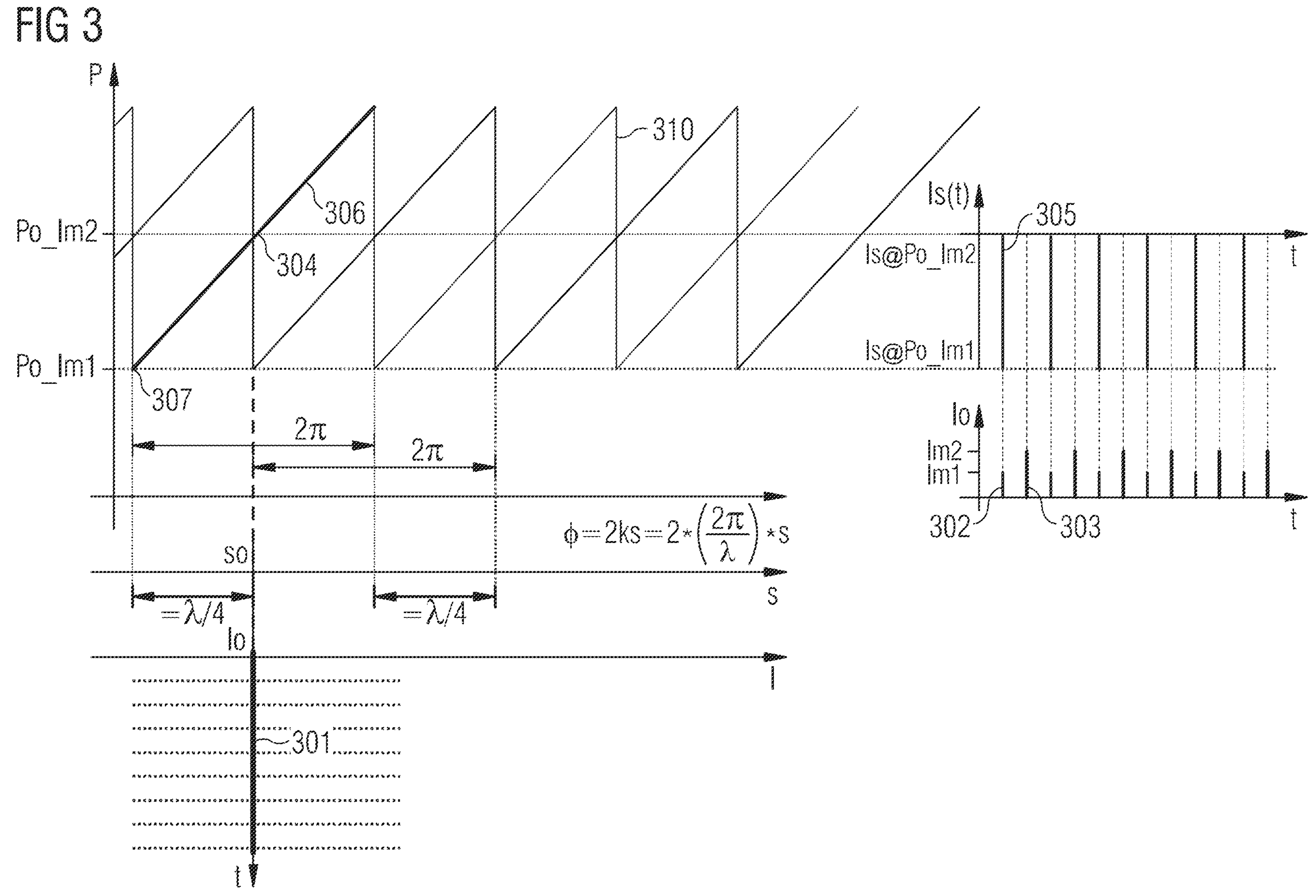
FIG. 3 shows signals present in the block diagram of FIG. 1 during calibration for half fringe optical phase locking at one reference current without an offset.

FIG. 3 shows the calibration process for half fringe optical phase locking with reference current Im2, wherein no offset is present. The distance between VCSEL and membrane is static so that ds(t)=0 shown at 301. The current amplitudes for Im1, Im2 are predetermined based on the LIV characteristic of the VCSEL (LIV: light-current-voltage). The same characteristic can be used for different circuits of the same production set. The values for Im1, Im2 are determined such that it is ensured that for a given distance between VCSEL and membrane, wherein the membrane is static, there will be a λ/4 phase difference for these two currents Im1, Im2. Depending on the static distance between VCSEL and membrane, circuit logic (not shown) decides to use one of Im1, Im2 for half fringe locking, in this case Im2 is selected. Current Im2 is used for half fringe locking and current Im1 is used as amplitude for the interrogation signal Io(t).

The transfer function 310 represents the SMI optical power P versus the SMI optical phase Φ. The interrogation signal Io(t) includes the amplitudes Im1, Im2 shown at 302, 303. An operating point by half fringe locking based on Im2 is shown at 304. The amplitude Im1 shown at 302 generates a response in the photodiode current Is(t) and a temporary shift of the operating point shown at 305. No offset is present, as the operating point in the transfer function 310 is at the middle or half fringe position of the fringe 306. Current Im2 is predetermined such that it causes a short term, temporary change of λ/4 from position 304 to position 307 so that the edge 307 of fringe 306 is detected. This results in current 305 of Is(t) being negative only from Is@Po_Im2 to Is@Po_Im1. In practice, current Im2 may be determined such that is generates a λ/4 change +/−10%. When current Im1 is smaller than depicted in FIG. 3 so that the response does not reach position 307, the current Is(t) will be correspondingly smaller. When current Im2 is larger than depicted in FIG. 3, the response will overshoot position 307 and reach the next fringe. An un-wrapper 220 will cope with this situation as explained in connection with FIG. 7.

Figure 4:
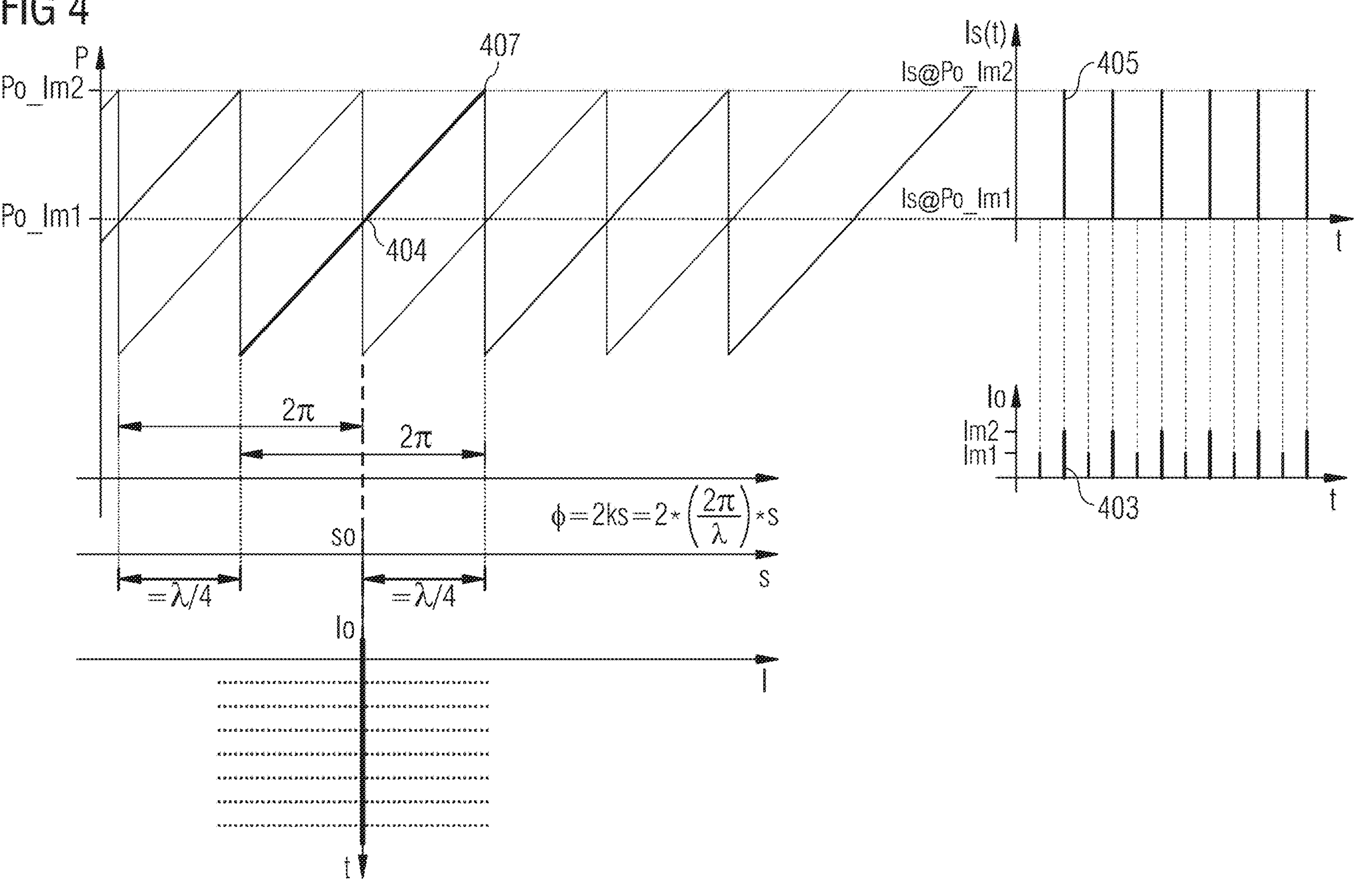
FIG. 4 shows signals during calibration for half fringe optical phase locking at another reference current without an offset.

FIG. 4 shows the calibration process for half fringe optical phase locking at reference current Im1, wherein no offset is present. The current Im2 shown at 403 causes a temporary shift of the operating point 404 to a modified operation point 407 and a corresponding response current shown at 405. No offset is present, as the current Im1 locks the phase at the half fringe position 404 of the transfer function so that the response current at 405 is only positive.

Figure 5:
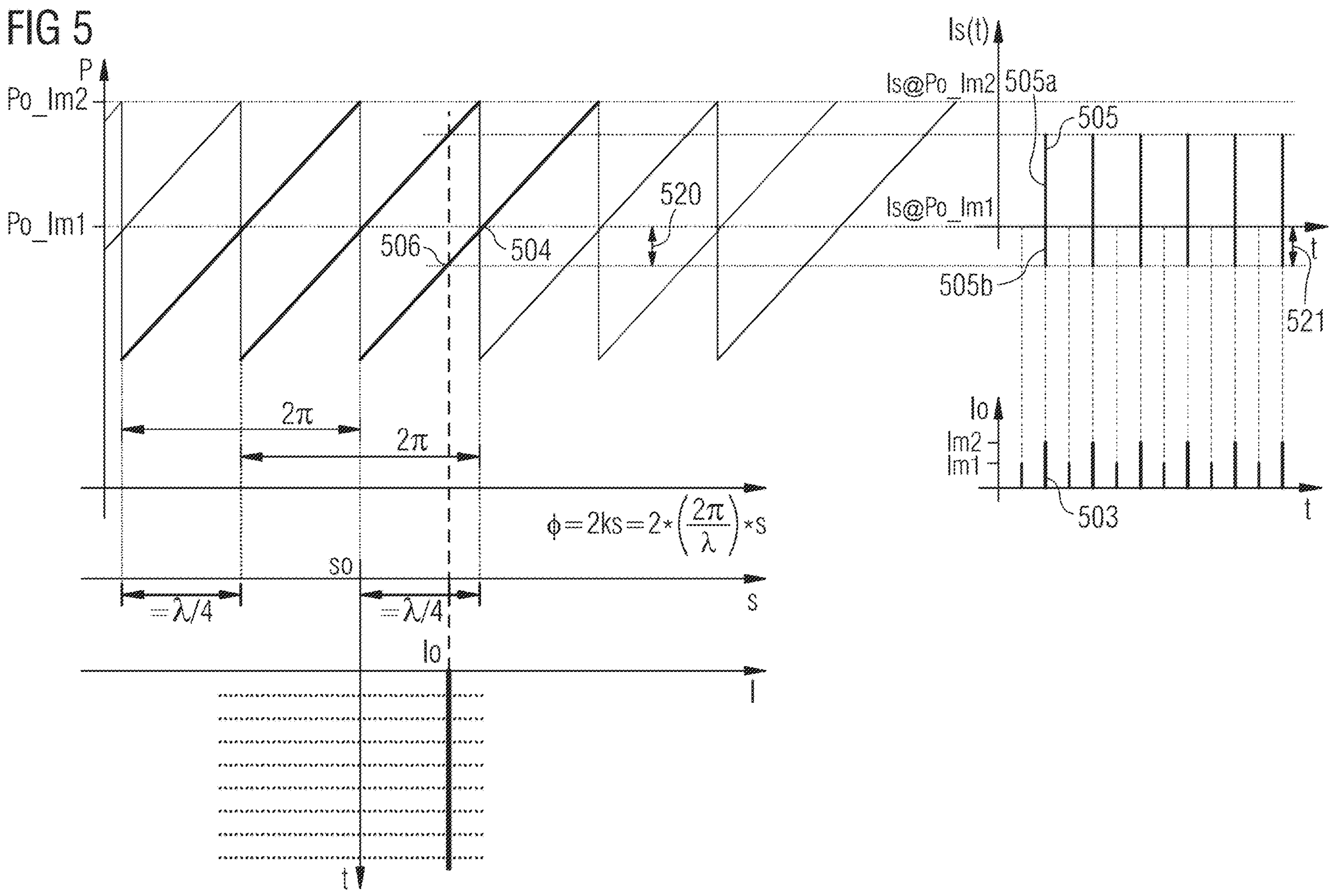
FIG. 5 shows signals during calibration for half fringe optical phase locking at another reference current with an offset detected.

FIG. 5 shows the calibration process for half fringe optical phase locking at reference current Im1, wherein an offset is present shown at 520 in the transfer function. The offset may be caused by a static distance between membrane and VCSEL caused by production misalignment or low frequency variations in response to aging, temperature or humidity. Half fringe locking is with current Im1 and generates an operating point 506 having offset 520 compared to a desired half fringe operating point 504. Current Im2 shown at 503 causes a λ/4 change on the transfer function resulting in response current 505. As an offset is present, current 505 has a positive portion 505*a* and a negative portion 505*b*. The presence of positive and negative portions 505*a*, 505*b* in the response current of photodiode current Is(t) is detected by the signal processor 102. In other words, it is detected that the response current 505 is not only positive (as was the case in FIG. 4). The negative amplitude amount 521 represents the amount of offset 520.

The signal processor 102 generates a compensation current in current comparator and DAC circuit 240 to compensate for the offset 520 and to move the operating point of the interferometer closer to the half fringe position 504 which is the desired operation point after calibration. In normal operation, the compensation current Ic(t) will be added or subtracted from Io(t) in VCSEL current driver 103. The amount of current to be added or subtracted from Io(t) may be determined by a lookup table or by other circuits implementing a scaling function. If a residual offset is present after calibration, a subsequent operation cycle will further reduce the residual offset. If no residual offset is present, the next calibration cycle will operate as shown in FIG. 4.

Figure 6:
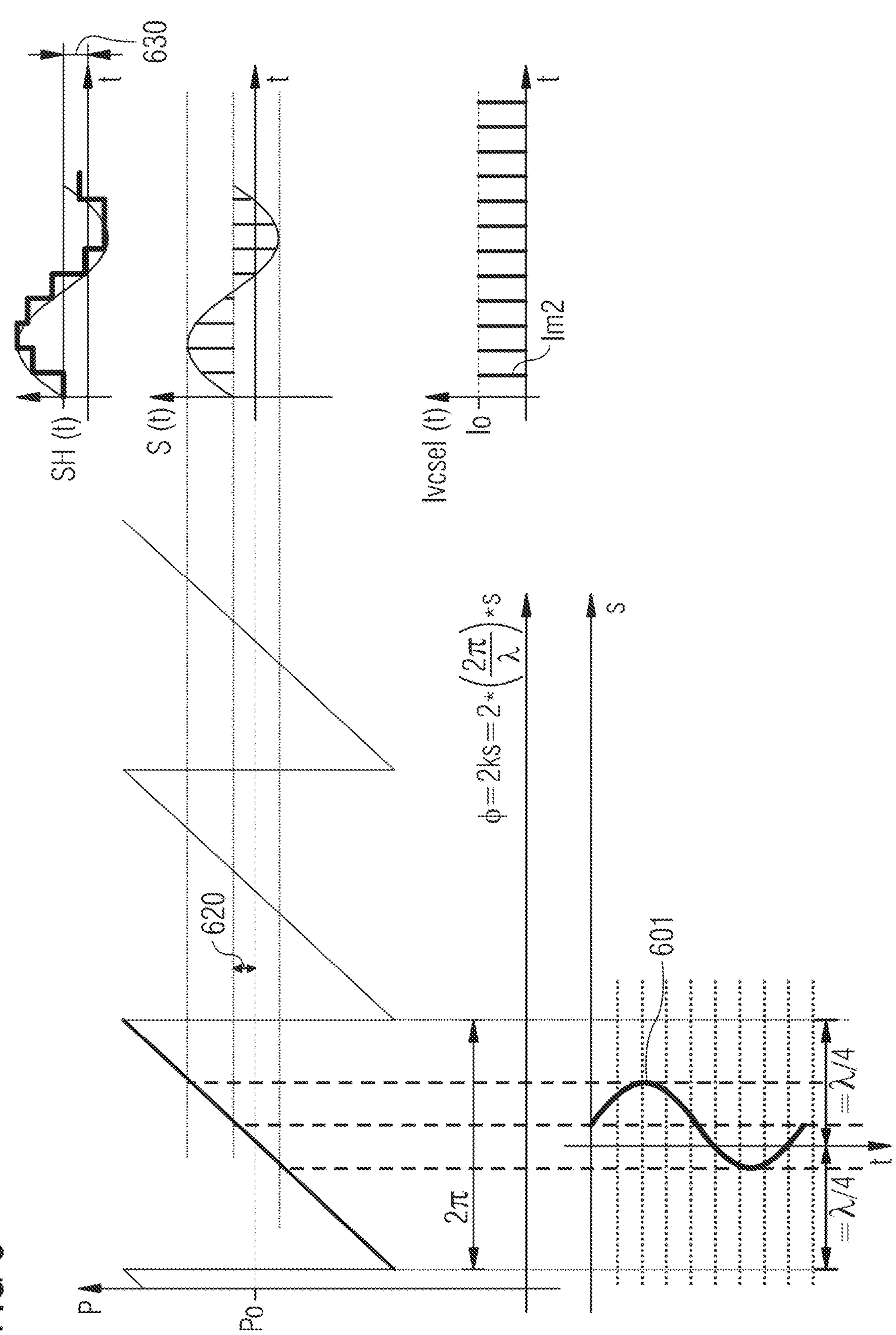
FIG. 6 shows signals during normal operation for half fringe optical phase locking with an offset present.

FIG. 6 shows the normal operation mode when calibration is not active and an offset is present. The loop is closed and Io(t) uses current Im2 for half fringe locking. In this case, current Im1 is used during calibration mode. Alternatively, current Im1 can be used for half fringe locking, if current Im2 is used during calibration mode. An audio signal received at the membrane of the VCSEL transducer 104 causes a displacement signal ds(t) shown at 601. The VCSEL has an offset shown at 620. Signal S (t) is present at the output of DC cutter 210 and signal SH(t) is present at the output of sample and hold circuit 231. As shown, signal SH(t) includes an offset 630. As the LPF filter 232 is active, the DC offset 630 will be determined at the output of filter 232. The photodiode current Is(t) includes the audio signal which is supplied as signal Dout at terminal 107 for further processing in the electronic device in normal operation mode.

Figure 7:
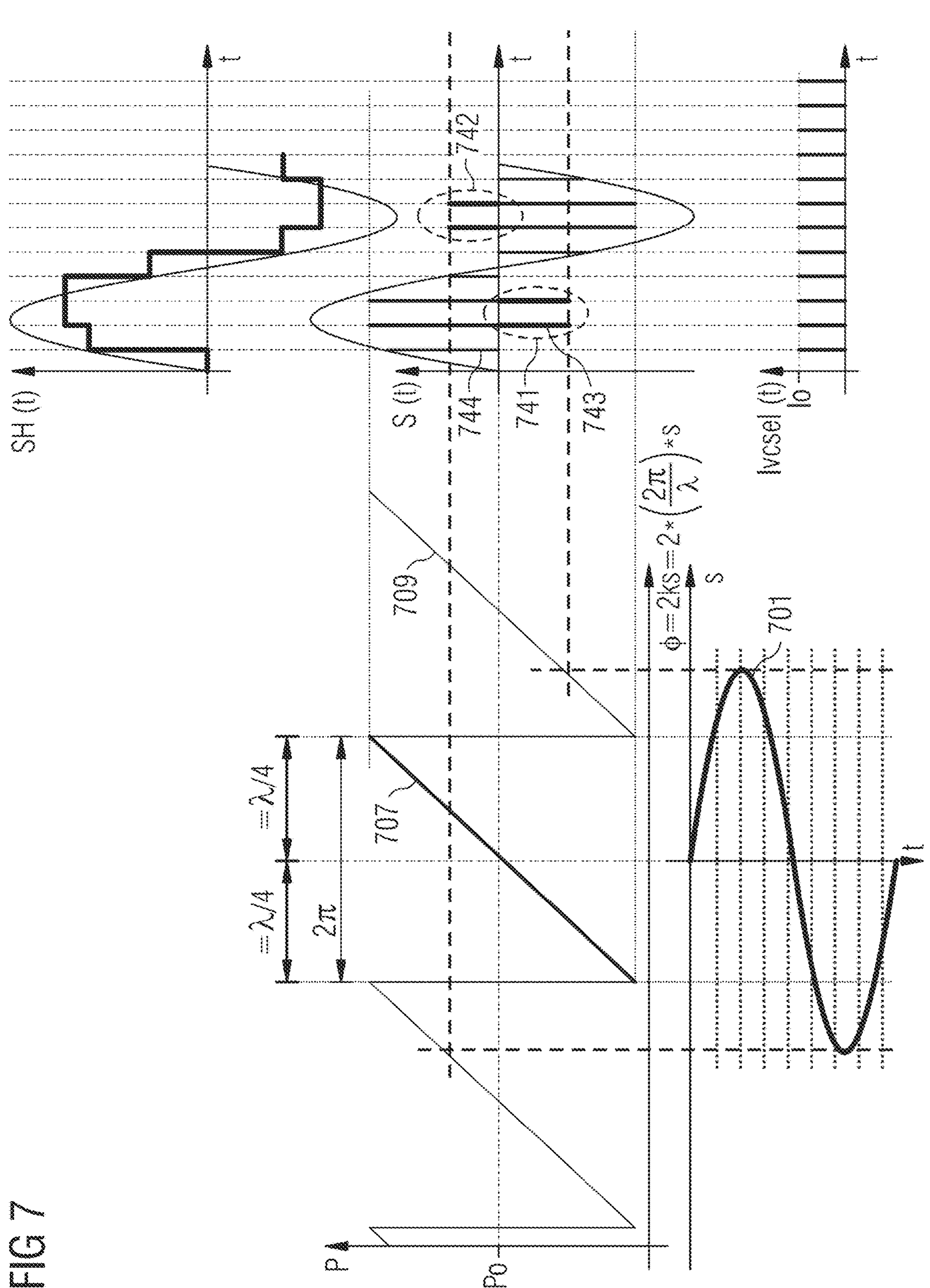
FIG. 7 shows signals during normal operation for half fringe optical phase locking in an overload situation.

FIG. 7 shows an overload situation in normal operation. Input signal ds(t) shown at 701 is so large that it skips from fringe 707 to fringe 709 of the transfer function. This generates a jump in the current pulses of signal S (t) shown at 741, 742. The un-wrapper circuit 220 in signal processor 102 detects a jump by comparing the samples with other samples previous in time such as comparing sample 743 with sample 744. The un-wrapper circuit 220 keeps the values of a few signal samples detected in time. If the difference in amplitude values of two consecutive samples is larger than a predetermined value, the un-wrapper circuit will keep the present sample value until a smaller difference is detected. The un-wrapper circuit can monitor more than two samples in order to make the overload detection decision.

Figure 8:
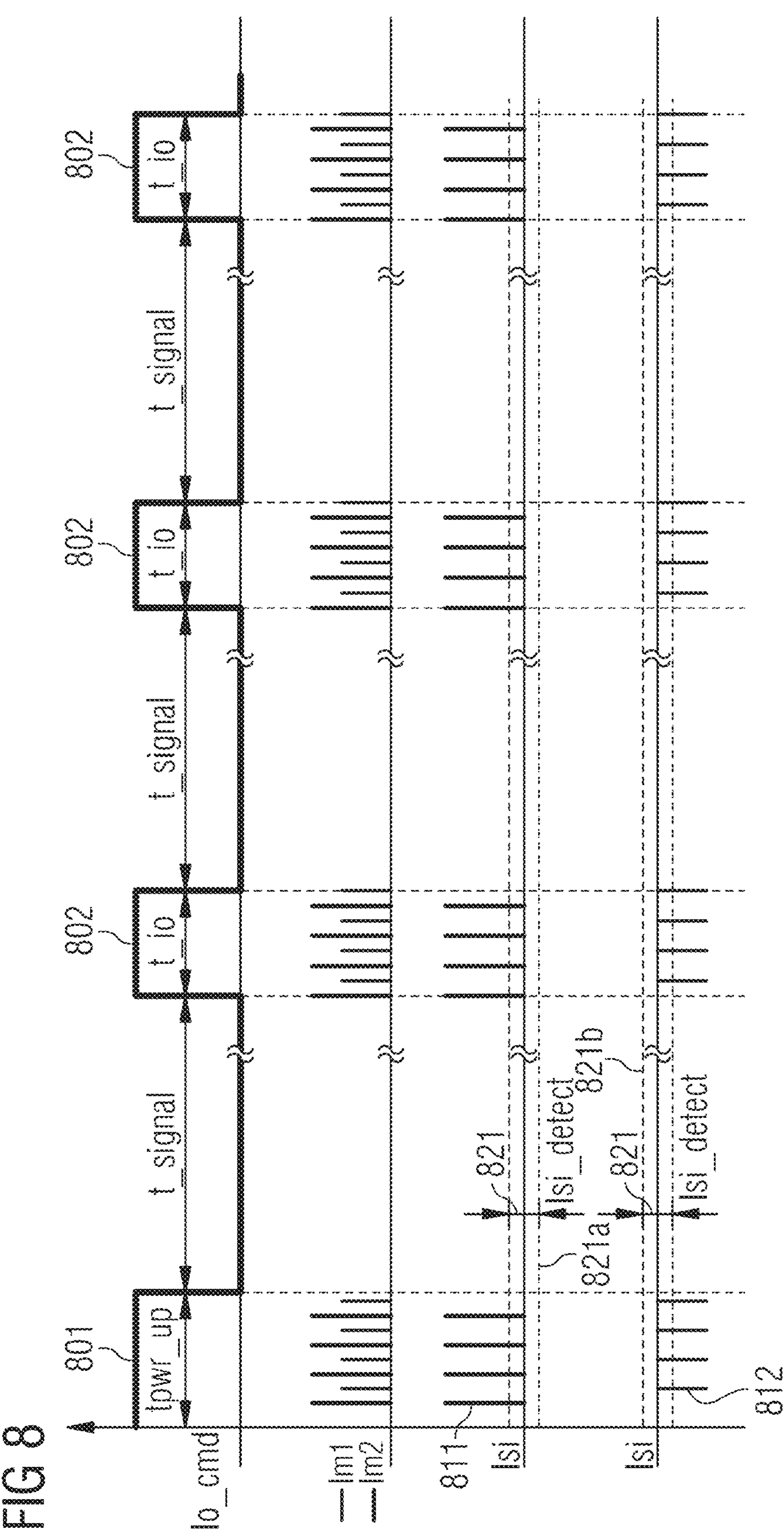
FIG. 8 shows optical phase locking waveforms during automated calibration.

FIG. 8 shows optical phase locking waveforms during calibration mode. If signal Io_cmd is high, calibration mode is active. This can be useful during power up shown at 801 or repetitively during operation of the interferometer shown at 802. During calibration mode, phase locking can be based on current Im1. A disturbing current signal based on current Im2 generates a response in the photo current shown at 811. Alternatively, phase locking can be based on current Im2 to generate a response in the photo current based on Im1 shown at 812. Threshold range 821 is used to detect an offset. In the shown situation, no offset is present, as currents 811, 812 comprise only positive or only negative portions. If an offset were present (not shown in FIG. 8), e.g., current 811 would also include a negative portion. If said negative portion exceeds the lower range limit 821*a*, an offset situation is detected. A corresponding situation applies to current 812 which is to be compared to upper range limit 821*b*. As can be seen in FIG. 8, the calibration mode can be activated after n measurement light pulses after expiry of time t_signal of normal operation.

Continuous Calibration

Figure 9:
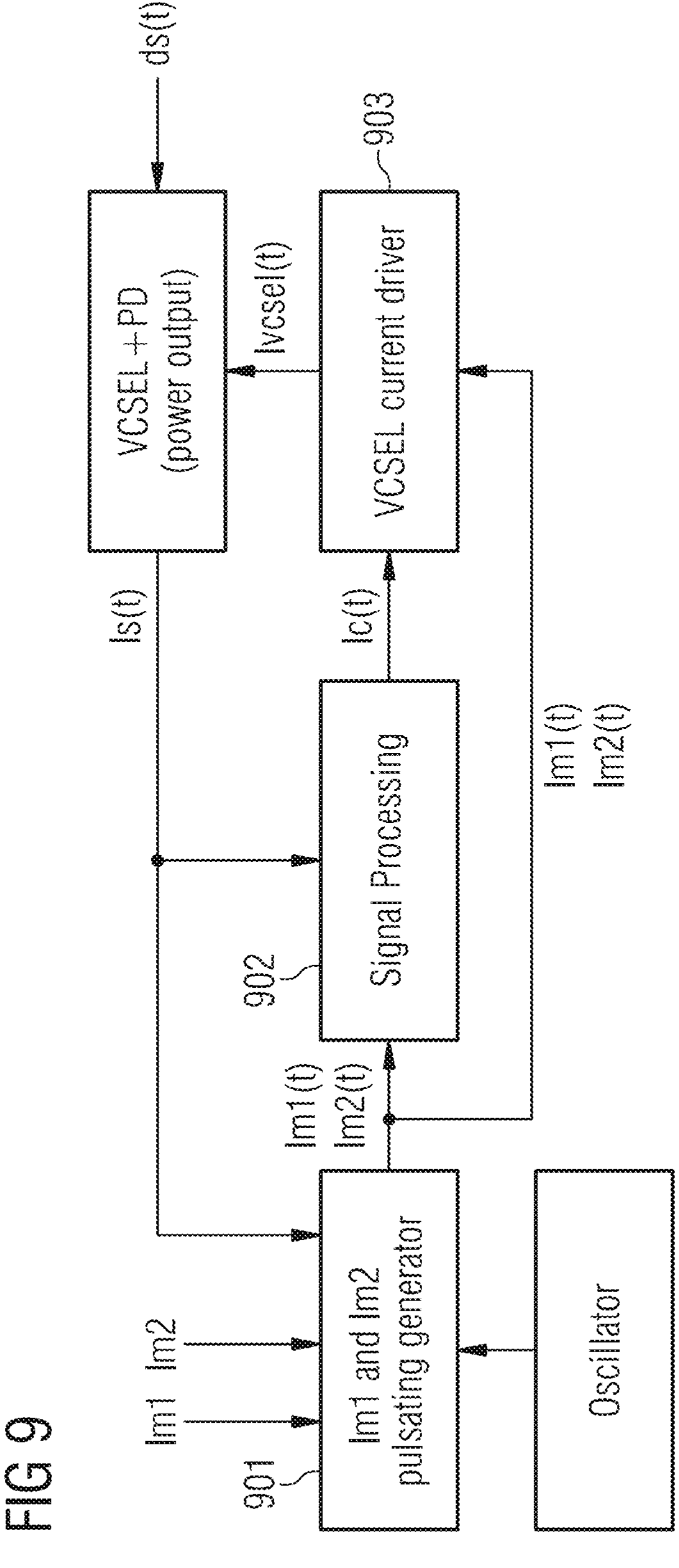
FIG. 9 shows a block diagram of a self-mixing interference measurement arrangement for optical phase locking during normal operation and continuous automated calibration.

With reference to the circuit shown in FIG. 9, calibration can be performed after every measurement pulse resulting in a so-called continuous calibration. The signal processer 902 in FIG. 9 receives both pulses Im1(*t*) and Im2(*t*) generated by Im1 and Im2 pulsating generator 901. Pulses Im1(*t*) and Im2(*t*) are also continuously provided to VCSEL current driver 903.

Figure 10:
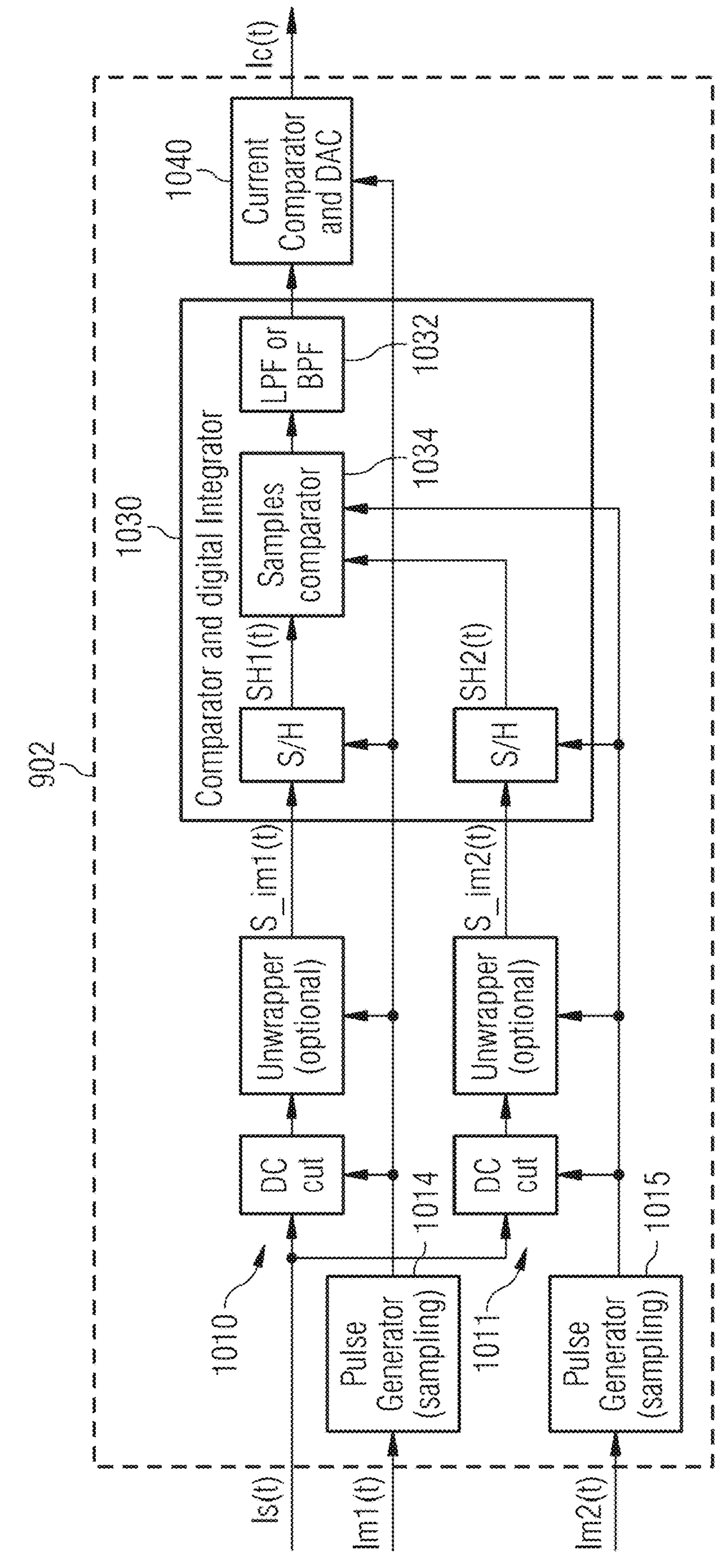
FIG. 10 shows a block diagram of the signal processing circuit of FIG. 9.

FIG. 10 shows a detailed block diagram of signal processor 902 of FIG. 9. The photodiode response current Is(t) is supplied to two corresponding paths 1010, 1011 that are sampled at the instances of signals Im1(*t*) and Im2(*t*), resp., generated by sampling pulse generators 1014, 1015, resp. The corresponding samples values SH1(*t*) and SH2(*t*) are compared in samples comparator circuit 1034 included in comparator and digital integrator circuit 1030. The filter circuit 1032 is continuously active having either low pass or band pass function depending on operational mode such as phase locking only and phase locking plus phase nulling, resp. Current comparator and DAC circuit 1040 generates the compensation current Ic(t).

Figure 11:
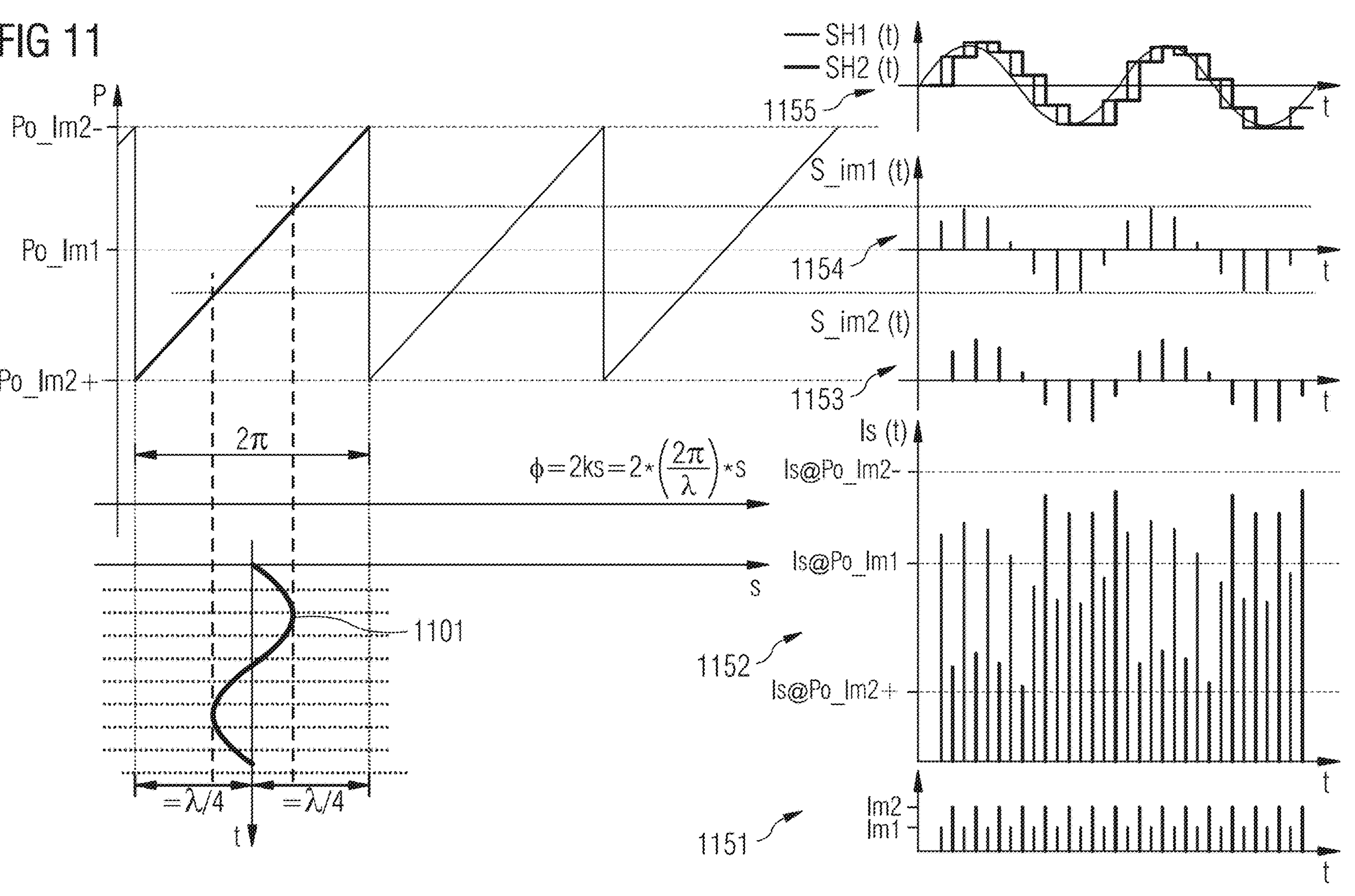
FIG. 11 shows optical phase locking waveforms during continuous automated calibration of the block diagrams shown in FIGS. 9 and 10.

FIG. 11 shows signals present in the circuit of FIGS. 9 and 10 for continuous automated calibration, wherein no offset is present. A displacement signal ds(t) shown at 1101 is applied. The reference currents Im1(*t*), Im2(*t*) are shown at 1151. They generate corresponding currents Is(t) shown at 1152. After DC cut at the DC cutter in signal processing circuit 902, signal pulses S_im1(*t*) and S_im2(*t*) are achieved as shown at 1154 and 1153, resp. The sample and hold circuits in signal processing circuit 902 generate the signals SH1(*t*) and SH2(*t*) as shown at 1155.

Pulsed Mode Operation

The automated calibration mode performs a calibration after expiry of a predetermined number of measurement pulses of normal operation or after each measurement pulse of normal operation. Accordingly, the interferometer circuit compensates the offset of the VCSEL arrangement several times or continuously during its operation so that it is always ensured that the operating point is in the optimum position at half fringe or close to half fringe of the transfer function of the VCSEL transducer. Thus, it is possible to operate the interferometer with pulsed laser operation. Due to the repetitive calibration operation which assures that low frequency drifts are immediately compensated, the duty cycle of the pulsed operation can be in the range of between 5% to 50%. In an embodiment, the duty cycle is around 10% or 10%. This avoids continuous (cw) laser operation which consumes considerable operating power. The pulsed VCSEL operation saves operating power so that the interferometer is useful in battery operated devices such as mobile communication devices or smartphones or such as smart speakers. The interferometer may be used to generate an electrical output signal representative of an acoustic signal received in a microphone or loudspeaker of the smartphone or the smart speaker.

It will be apparent to those skilled in the art that various modifications and variations can be made without departing from the spirit or scope of the disclosure as laid down in the appended claims. Since modifications, combinations, sub-combinations and variations of the disclosed embodiments incorporating the spirit and substance of the disclosure may occur to the persons skilled in the art, the disclosure should be construed to include everything within the scope of the appended claims.

The invention claimed is:

1. A method for calibrating a self-mixing interferometer, the method comprising:

providing the self-mixing interferometer including a laser diode;

emitting laser light and receiving a reflected portion of the emitted laser light to modulate an optical power of the laser diode, the interferometer having a transfer function of the optical power of the laser diode comprising fringes;

locking a phase of the laser light to at least one of the fringes to obtain an operating point;

generating an interrogation signal to change a wavelength of the laser light to obtain a response signal indicative of an offset of the operating point from a desired operating point; and generating a compensation signal depending on the response signal.

2. The method according to claim 1, wherein a calibrated operating point is achieved such that the calibrated operating point is disposed at half of the at least one of the fringes of the transfer function or close to half of the at least one of the fringes of the transfer function.

3. The method according to claim 1, wherein the interrogation signal is pulse-shaped and determined such that the laser light is changed by a quarter of the wavelength of the laser light or close to a quarter of the wavelength of the laser light.

4. The method according to claim 1, wherein a monitoring signal is a current generated by a monitoring photodiode representative of the optical power of the laser diode, and wherein the method further comprises detecting whether the monitoring current is only positive or is only negative or includes positive and negative portions.

5. The method according to claim 1, wherein a monitoring signal is a current generated by a monitoring photodiode representative of the optical power of the laser diode, and wherein the method further comprises comparing the current with a comparison threshold in response to generating the interrogation signal.

6. The method according to claim 1, wherein the interrogation signal includes a first reference current to lock the phase of the laser light to the at least one of the fringes to obtain the operating point and a second reference current to change the wavelength of the laser light by a quarter of the wavelength or close to a quarter of the wavelength.

7. The method according to claim 6, wherein the self-mixing interferometer is further operated in normal operation mode, during which the optical power of the laser diode is modified by a portion of the laser light reflected at a moving target, and wherein the laser diode is driven in response to a difference between the interrogation signal and the compensation signal.

8. The method according to claim 7, further comprising reducing the second reference current in response to the compensation signal.

9. The method according to claim 7, wherein the laser light is emitted in a series of consecutive pulses to perform a measurement of a movement of the moving target, and wherein the interrogation signal is generated repetitively after a predetermined number of the consecutive pulses.

10. The method according to claim 9, wherein the interrogation signal is generated after each one of the consecutive pulses.

11. A self-mixing interference measurement arrangement comprising:

the laser diode configured to emit the laser light and receive the portion of the reflected laser light of a moving target and a photodiode configured to generate the photo current indicative of the optical power emitted by the laser diode;

a current driver configured to generate a current to operate the laser diode;

an amplitude setup circuit configured to generate a current representative of the interrogation signal; and a signal processor configured to receive the photo current and to receive the interrogation signal and generate an output signal indicative of the offset of the operating point from the desired operating point, wherein the self-mixing interference measurement arrangement is configured to perform the method according to claim 1.

12. The self-mixing interference measurement arrangement according to claim 11, wherein the signal processor comprises:

an input terminal configured to operatively receive the photo current;

a DC component cutter connected to the input terminal and configured to remove a DC component;

a sample and hold circuit configured to provide a sample of an output signal of the DC component cutter; and a current comparator configured to determine a difference between the photo current and the interrogation signal.

13. The self-mixing interference measurement arrangement according to claim 12, further comprising:

a low-pass filter or a band-pass filter disposed between the DC component cutter and the current comparator configured to be selectively enabled in a normal operation mode, wherein the current driver is configured to receive the interrogation signal and to generate the current to operate the laser diode from a difference between the interrogation signal and the output signal indicative of the offset.

14. An electro-acoustic device comprising:

a membrane configured to receive or emit acoustic energy;

the self-mixing interference measurement arrangement according to claim 11, wherein the membrane is configured to reflect the laser light emitted by the laser diode; and a terminal connected to the self-mixing interference measurement arrangement and configured to provide a signal indicative of the acoustic energy received or emitted by the membrane.

15. The electro-acoustic device according to claim 14, wherein the electro-acoustic device is a microphone or a loudspeaker configured for incorporation in one of an audio signal processing device, a mobile communication device, a smartphone or a smart speaker.

* * * * *